Figure 4:
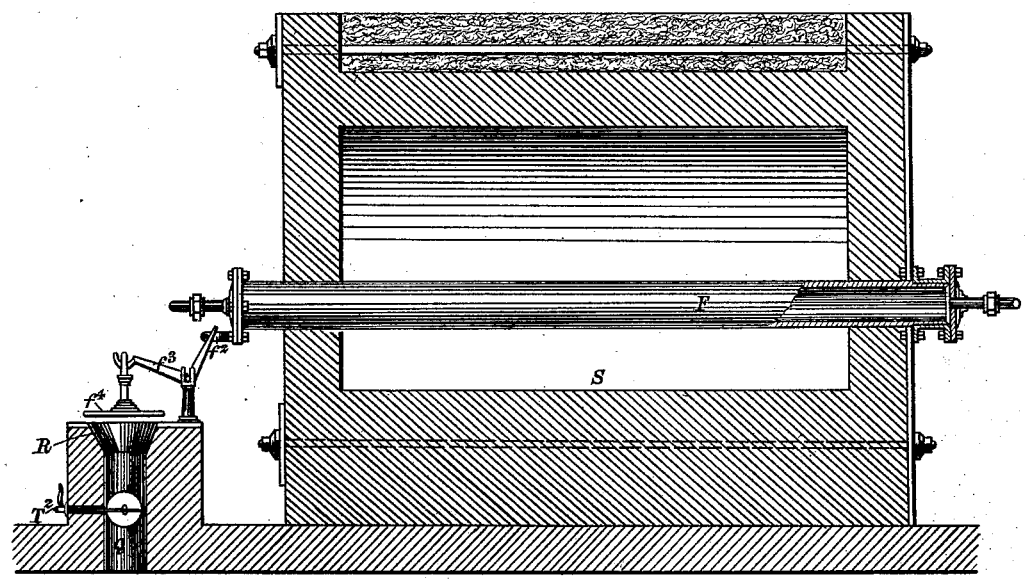

(No Model.)  L. Q. & A. BRIN.  5 Sheets—Sheet 1.
APPARATUS FOR OBTAINING OXYGEN FROM AIR.
No. 359,424. Patented Mar. 15, 1887.
FIG. I.
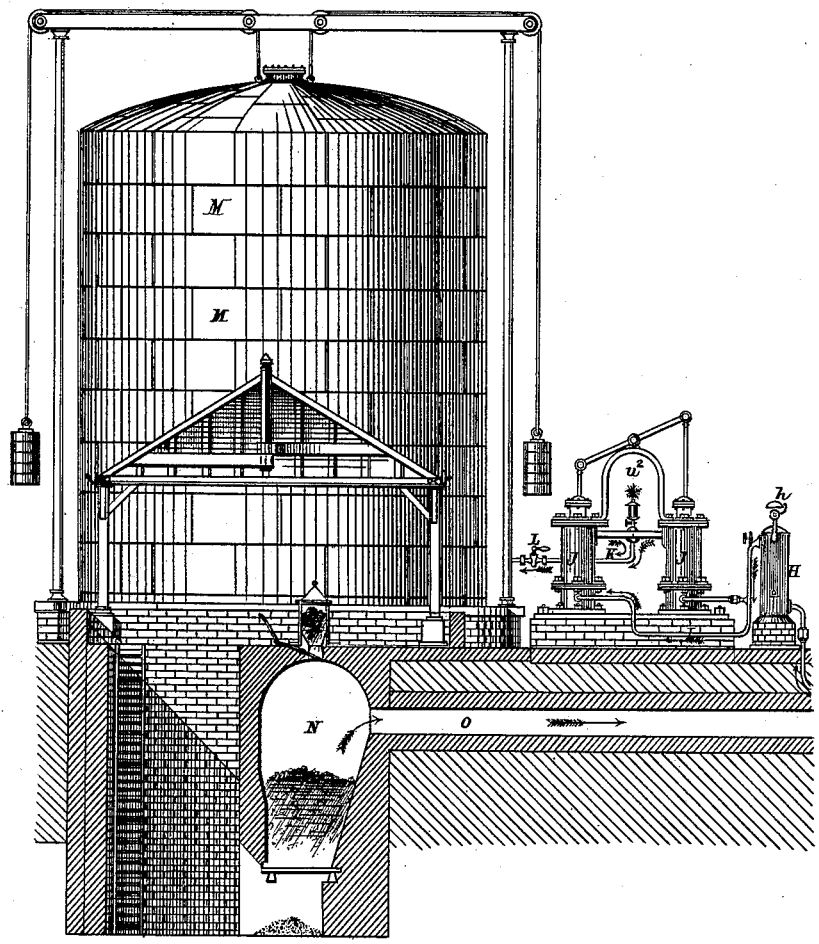
Witnesses.
A. Ruppert.
E. Cruse
Inventors.
Leon Quentin Brin,
Arthur Brin,

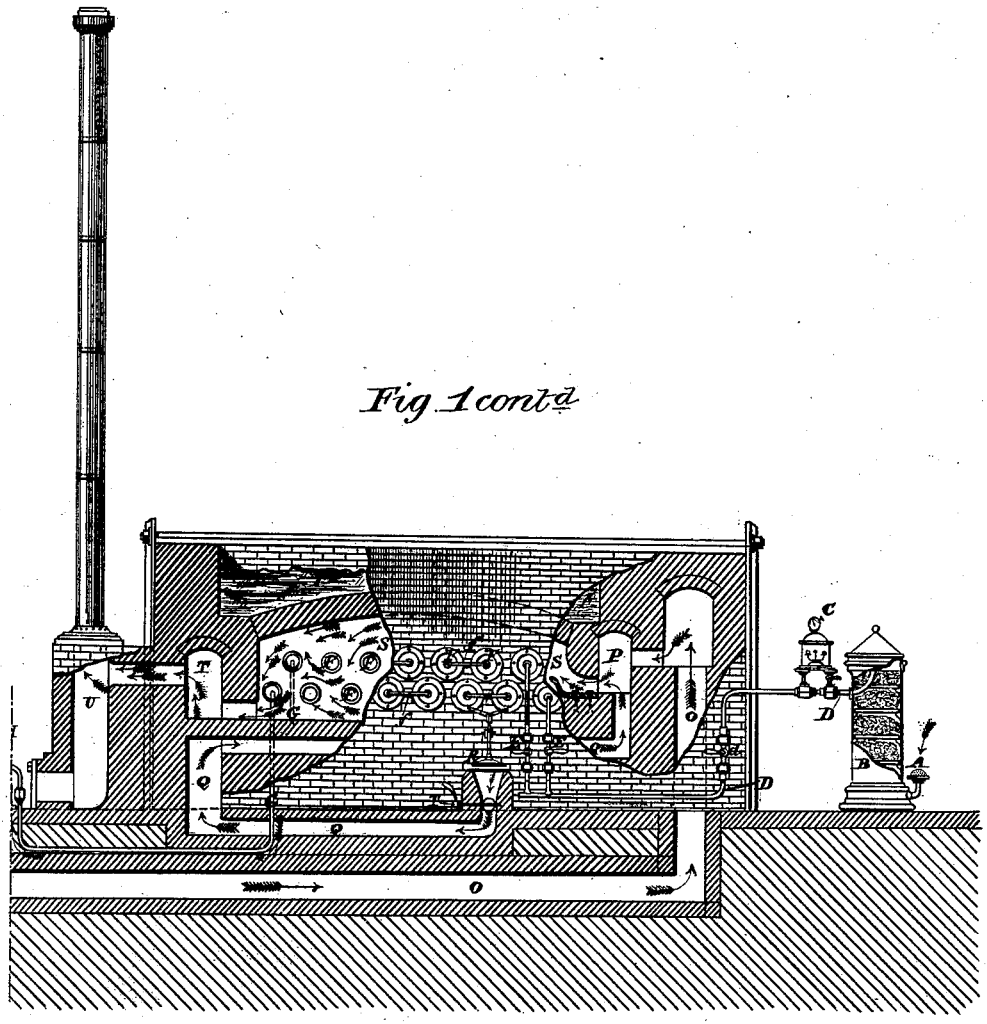

(No Model.)
L. Q. & A. BRIN.
APPARATUS FOR OBTAINING OXYGEN FROM AIR.
No. 359,424. Patented Mar. 15, 1887.
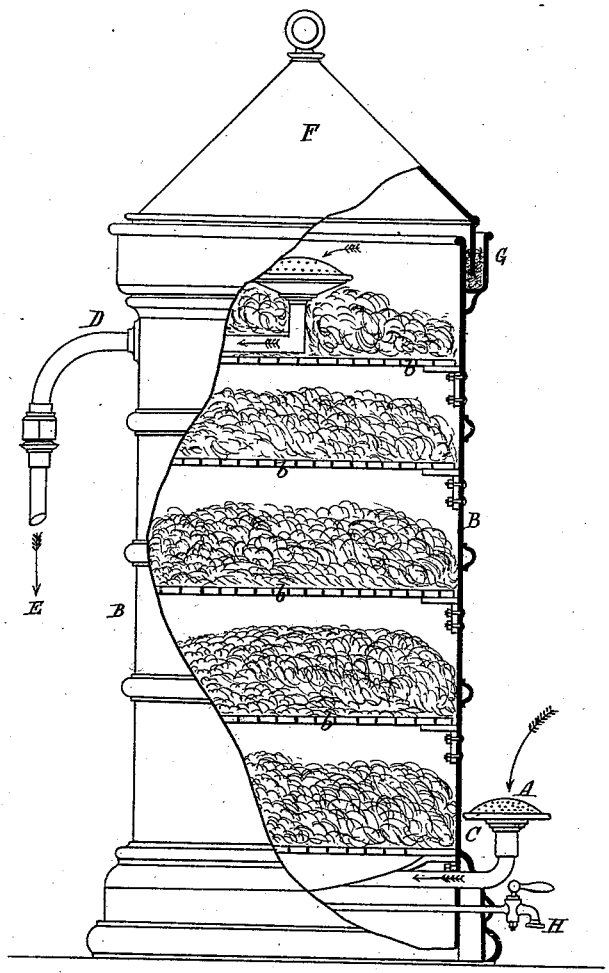

(No Model.)  L. Q. & A. BRIN.  5 Sheets—Sheet 4.

APPARATUS FOR OBTAINING OXYGEN FROM AIR.

No. 359,424. Patented Mar. 15, 1887.

Witnesses.
A. Ruppert.
E. Cruse

Inventors.
Leon Quentin Brin,
Arthur Brin, (No Model.)  L. Q. & A. BRIN.  5 Sheets—Sheet 5.
APPARATUS FOR OBTAINING OXYGEN FROM AIR.
No. 359,424.  Patented Mar. 15, 1887.

Witnesses.
A. Ruppert
E. Cruse

Inventors.
Leon Quentin Brin,
Arthur Brin,
by their atty's

United States Patent Office.

LÉON QUENTIN BRIN AND ARTHUR BRIN, OF PARIS, FRANCE, ASSIGNORS, BY MESNE ASSIGNMENTS, TO THE CONTINENTAL OXYGEN COMPANY, (LIMITED,) OF LONDON, ENGLAND.

APPARATUS FOR OBTAINING OXYGEN FROM AIR.

SPECIFICATION forming part of Letters Patent No. 359,424, dated March 15, 1887.

Application filed March 19, 1885. Serial No. 159,440. (No model.) Patented in England April 7, 1880, No. 1,416, and January 5, 1885, No. 157; in France April 7, 1880, No. 135,954; in Belgium June 19, 1880, No. 51,809, and in Spain December 5, 1881, No. 2,056.

*To all whom it may concern:*

Be it known that we, LÉON QUENTIN BRIN and ARTHUR BRIN, civil engineers, citizens of the Republic of France, and residing at Paris, in the said Republic, have invented certain Improvements in the Separation and Obtainment of Oxygen and Nitrogen from Atmospheric Air, (for which we have applied for a patent in Great Britan, No. 157, dated 5th January, 1885,) of which the following is a specification.

Our invention has for its object to provide means whereby oxygen and nitrogen may be separated from atmospheric air and obtained separately from each other in a commercially available manner.

According to our invention, we first separate from atmospheric air the moisture and the carbonic-acid gas contained therein, which may conveniently be effected by drawing the air through a substance or substances which will absorb moisture and carbonic-acid gas. Quicklime and caustic soda are suitable substances for the purposes of our invention, and they may be contained in any suitable vessel or chamber, or vessels or chambers, provided with an inlet for the ordinary air and an outlet for the mixed oxygen and nitrogen after the said substance or substances have caused the separation therefrom of both the moisture and the carbonic-acid gas. The mixed oxygen and nitrogen are then drawn by pumps or suction apparatus through pipes or passages into a retort or retorts containing heated baryta, free from carbonic acid and nitric acid and moisture, such as is the anhydrous oxide of barium, prepared as described in the specification of our application for a patent of even date with this. The said heated anhydrous oxide of barium will absorb the oxygen, the nitrogen being drawn off and passed into a suitable receiver. When the said heated anhydrous oxide of barium has absorbed all the oxygen it can take up, the inlet for the drawing in of the air is closed, and consequently the supply of mixed oxygen and nitrogen to the retorts is stopped, the outlet for the nitrogen is closed, and the inlet to a holder for the oxygen is opened, and the oxygen is withdrawn from the anhydrous oxide of barium by the pumps or suction apparatus, creating a vacuum or a partial vacuum in the retort or retorts, and the said oxygen is passed into its receiver. During this time the heat may be increased with advantage. The process may then be repeated, the peculiar nature of the anhydrous oxide of barium and the previous treatment of the air to withdraw carbonic acid and moisture allowing of the process being carried on in a continuous and commercially successful manner.

The apparatus and retorts used in the process may be arranged in any suitable way; but the pump for drawing in the air and for creating the vacuum should be situated between the outlet of the retorts and the gasometers, where the produced gases are stored. The proper heating of the retorts during the withdrawal of the oxygen therefrom may be regulated by making the movement of one or more of the retorts themselves under the action of heat act as a pyrometer to operate the admission-valve for air to control the combustion for heating the retorts.

In order that our said invention may be fully understood, we shall now proceed more particularly to describe the same and a convenient apparatus in which to carry on the process, and for that purpose shall refer to the several figures on the annexed sheets of drawings, the said letters of reference indicating corresponding parts in all the figures; but we premise that we do not limit ourselves to the precise form or arrangement of apparatus illustrated.

Figure 3:
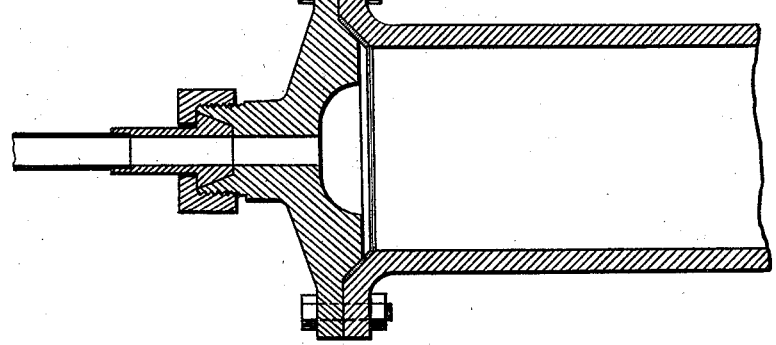
Figure 5:
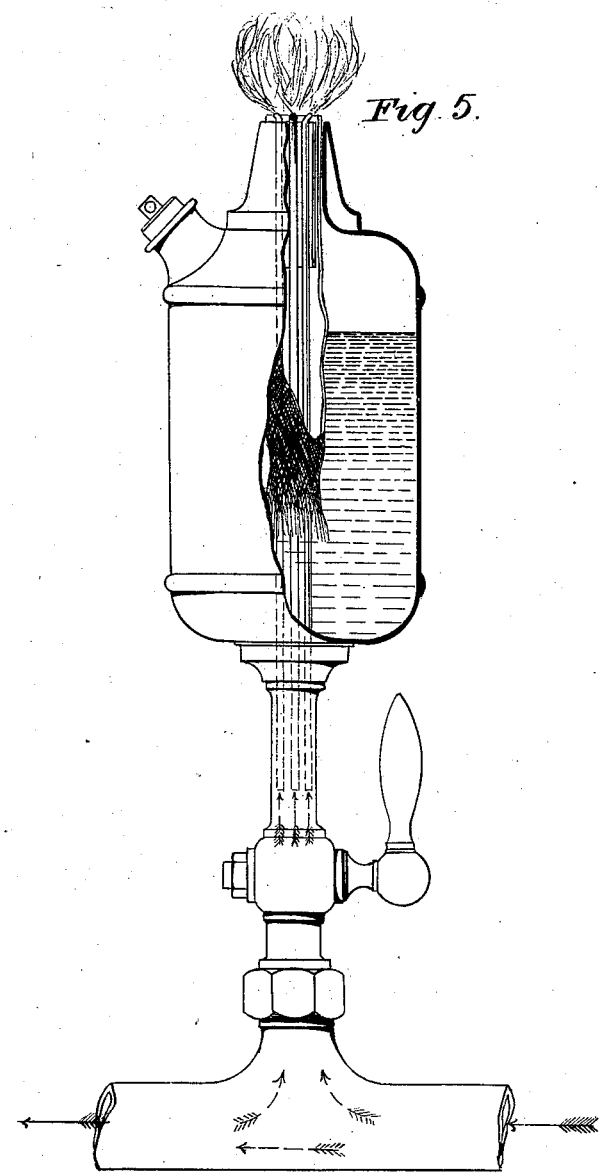

Figure 1 of the drawings is a general view of a suitable plant for carrying on the manufacture according to our invention. Fig. 2 represents separately, partly in section, the apparatus for separating moisture and carbonic acid from the atmospheric air. Fig. 3 shows a detail of the head of one of the retorts for containing the anhydrous oxide of barium; and Fig. 4 represents a longitudinal section of the bench of retorts, showing a detail of the arrangement whereby a retort is caused to act as a regulating-pyrometer. Fig. 5 illustrates the lamp, hereinafter described.

A is an inlet for the air through layers of caustic soda and lime placed on trays or supports $b$ in the vessel B.

D is the outlet from the vessel B for the mixture of oxygen and nitrogen after the moisture and carbonic acid have been separated therefrom, and C is a hygrometric balance for indicating the degrees of dryness of the mixture of oxygen and nitrogen drawn therethrough. $d$ is a cock for closing the said outlet, and E E are cocks for admitting the said mixture of oxygen and nitrogen to the retorts F F, as required. The said retorts F F are preferably provided with ends and points at each extremity, like that shown at Fig. 3, and contain anhydrous oxide of barium, and communicate the one with the other by pipes or passages $f f$, the last of the series being provided with a pipe or passage, G, for the drawing off of the oxygen or the nitrogen from the retorts.

H is a vacuum-chamber for the reception of nitrogen during the peroxidation of the anhydrous oxide of barium in the retorts F, and subsequently of oxygen during the deoxidation of the said oxide of barium. This chamber H is in communication with a vacuum-indicator surmounted by an electric bell, $h$, which rings when the deoxidation ought to be arrested, a column of mercury in the instrument being lengthened to make contact for sounding the bell, owing to alteration in pressure when there is no more oxygen coming from the retorts.

I I are pipes leading from the said chamber H to the pumps J J, acting to draw air into the apparatus at A.

K is an outlet-pipe for the gases, and L is a three-way cock through which the nitrogen is directed into a gasometer during the peroxidation of the anhydrous oxide of barium in the retorts F, and through which the oxygen is directed into the gasometer M during the deoxidation of the said oxide of barium, the passages or pipes from K being arranged so that they can be opened to and closed by the said cock from either the gasometer for the oxygen or the gasometer for the nitrogen, as required.

N is a gas producer or furnace producing carbonic oxide, and O is a conduit conducting the carbonic oxide to the distribution-flues leading to the chamber P, in which the carbonic oxide meets with air and becomes ignited and burns to heat the retorts F. The said air is admitted by the conduit Q, which is provided with a damper, $T^2$, and with a regulator-valve, R, operated upon by one of the retorts acting as a pyrometer, as aforesaid, and as illustrated more particularly in Fig. 4.

S is the furnace containing the retorts F, around which circulates the heat from the gas-producer. T is a chamber, and U is a chimney for the escape of the gases after passing through the furnace S.

$u^2$ is a lamp (shown in detail in Fig. 5) in communication with a discharge-pipe of the pump, so that the part of the gases passing through the said pipe are conducted to the burner of the lamp, and, being ignited thereby, cause the lamp to act as an indicator, showing the progress of the operations.

The air drawn in by the pumps J J enters the apparatus through the inlet A. It is drawn through the compartments of the apparatus B containing caustic soda and lime, and is by this means deprived of its carbonic acid and moisture, these being taken up by the multiple surfaces of the said materials with which the air is brought into contact. The apparatus C indicates the degrees of dryness of the mixture of oxygen and nitrogen thus produced, which is drawn through the pipe D and cock $d$ and through the two cocks E E, and thence into the retorts F F and through or over the anhydrous oxide of barium contained therein, which takes up the oxygen, and thus leaves the nitrogen free, the said nitrogen passing through the pipes G G into the vacuum-chamber H, whence it is drawn by the pumps J J, and is discharged or directed through the three-way cock L into the gasometer provided for its reception.

When the contents of the retorts F have taken up as much oxygen as they will take up, (which will be shown by the lamp $u^2$, indicating that oxygen is present in the passing gas,) the cock $d$ is closed. The pumps J J, continuing to work, extract the oxygen which has combined with the anhydrous oxide, the vacuum created in the retorts by the action of the pumps greatly facilitating the operation.

Before beginning to store the oxygen it is necessary to purge the pipes and the chamber H of the nitrogen which they contain. For this purpose the lamp $u^2$ is watched, and as soon as pure oxygen is observed to be passing the cock L is shifted so as to cause the oxygen to pass into the gasometer provided for its reception.

The heating agent employed for the retorts F in the arrangement shown is carbonic oxide produced by a gas-producer, N. This carbonic oxide passes through the conduit O, and is distributed in the flues and delivered into the chamber P, where, when required, it meets and mingles with the atmospheric air entering by the passage Q. The heating agent circulates around the retorts F in the furnace S, and thence passes to the chamber T, from which it is discharged into the chimney.

The temperature of the retorts while their contents are taking up the oxygen should be maintained between 500° and 600° centigrade, or thereabout, and this heating is accomplished by the carbonic oxide alone, the valve $T^2$ in the passage Q being closed; but the temperature of the said retorts while the oxygen so taken up is being withdrawn should be raised to 800°, or thereabout, this raising of the temperature being accomplished by opening the valve T² and admitting air by the passage Q. In order to regulate with absolute precision this elevated temperature we prefer to employ a pyrometer for the purpose of automatically regulating the admission of air by the passage Q, and this pyrometer may be formed by one or more of the retorts. Fig. 4 shows a retort arranged for this purpose. The said retort is prevented from expanding at one end by a support to which it is rigidly attached and which forms part of the body of the furnace. The effects of expansion are consequently concentrated on the other end, which is left free. When expansion takes place, a stop or projection, $f^2$, on the head of the retort allows a bell-crank lever, $f^3$, to move to lower the disk or valve $f^4$ for reducing the quantity of air admitted at R to mix with the carbonic oxide from the furnace N. During the withdrawal of the oxygen from the retorts F this valve or damper at R and also the valve at T² are fully open and the air enters freely and the temperature rises to the required degree. When a temperature of 800° centigrade, or thereabout, is reached, the retort by expanding allows the disk or valve R to descend, and thus the supply of air is diminished, and, consequently, the temperature is prevented from rising. We thus obtain great regularity in the heating, which tends to preserve the apparatus, and insures a perfectly regular automatic action independently of the care of the workmen.

It will be understood that when the oxygen has been withdrawn from the contents of the retorts the air is again admitted at A, and the process already described is repeated as many times as desired.

Having now particularly described and ascertained the nature of our said invention and in what manner the same is to be performed, we declare that what we claim is—

1. The vessel B, provided with trays or supports $b$, and having the air-inlet A, combined with the retorts F F, pipes D and G, and pumps J J, substantially as set forth.

2. The vessel B, provided with trays or supports $b$, and having the air-inlet A and a series of retorts, F F, connected to said chamber B, said retorts communicating with each other by means of pipes $f f$, combined with the vacuum-chamber H and pumps J J, substantially as described.

3. The vessel B, having the air-inlet A and the trays or supports $b$, and the hygrometric balance C, combined with the retorts F F, vaccum-chamber H, pumps J J, and suitable storage-vessels, substantially as and for the purpose described.

4. The furnace S, provided with a series of retorts, F F, communicating with each other, and the mixing-chamber P, combined with the gas-producing furnace N, and conduits O and Q, substantially as and for the purpose described.

5. The furnace S, provided with a series of retorts, F, and the mixing-chamber P, combined with the gas-producing furnace N, conduit O, and conduit Q, having the valve T² and disk $f^4$, substantially as described.

6. The conduit Q, combined with the disk $f^4$, bell-crank lever $f^3$, and retort F, the retort F being rigidly attached to the body of the furnace S at one end, and being free to expand and contract at the opposite end to operate the bell-crank lever $f^3$, whereby the conduit Q is automatically opened or closed, substantially as described.

7. A furnace provided with a series of retorts and a mixing-chamber, a gas-producing furnace communicating with said chamber by means of a suitable conduit, and a conduit leading from said chamber to the open air, combined with a vessel for drying atmospheric air and extracting carbonic gas therefrom, and pumps for drawing the dried and purified air through said retorts, substantially as and for the purpose specified.

In testimony whereof we have signed our names to this specification in the presence of two subscribing witnesses.

LÉON QUENTIN BRIN.
   ARTHUR BRIN.

Witnesses:
 SAMUEL W. CRAGG,
 ED. KOCH,
  *Both of 6 Rue Volney.*